(12) United States Patent
Daniel, IV

(10) Patent No.: US 8,919,262 B2
(45) Date of Patent: Dec. 30, 2014

(54) TROLLING MOTOR RIGGING STATION

(71) Applicant: Charles D. Daniel, IV, Gainesville, FL (US)

(72) Inventor: Charles D. Daniel, IV, Gainesville, FL (US)

( * ) Notice: Subject to any disclaimer, the term of this patent is extended or adjusted under 35 U.S.C. 154(b) by 0 days.

(21) Appl. No.: 13/693,382

(22) Filed: Dec. 4, 2012

(65) Prior Publication Data

US 2013/0139733 A1    Jun. 6, 2013

Related U.S. Application Data

(60) Provisional application No. 61/630,190, filed on Dec. 6, 2011.

(51) Int. Cl.
*A47B 23/00*    (2006.01)
*A47B 37/00*    (2006.01)
*A47B 13/00*    (2006.01)
*A01K 97/00*    (2006.01)

(52) U.S. Cl.
CPC ............... *A01K 97/00* (2013.01); *A47B 37/00* (2013.01); *A47B 13/003* (2013.01)
USPC .................. 108/44; 108/42; 114/343

(58) Field of Classification Search
USPC ......... 108/42, 44, 45, 152, 90, 92, 96, 95, 94, 108/97, 98; 114/343
See application file for complete search history.

(56) References Cited

U.S. PATENT DOCUMENTS

| | | | |
|---|---|---|---|
| 907,539 A | 12/1908 | Thomas | |
| 3,391,960 A * | 7/1968 | Megargle et al. | 108/44 |
| 3,575,481 A | 4/1971 | Phlieger, Jr. | |
| 3,592,144 A * | 7/1971 | Futrell | 108/44 |
| 4,017,050 A | 4/1977 | Rosenau | |
| 4,062,299 A | 12/1977 | Smith | |
| 4,086,859 A * | 5/1978 | Dondero | 108/44 |
| 4,129,088 A | 12/1978 | Foley, Jr. | |
| 4,136,989 A | 1/1979 | Bianco | |
| D259,603 S * | 6/1981 | Gagnon | D6/483 |
| D298,226 S * | 10/1988 | Thomas | D12/318 |
| 4,976,204 A * | 12/1990 | Konkle | 108/43 |
| 4,989,535 A * | 2/1991 | Lacasse et al. | 114/343 |
| 5,085,153 A * | 2/1992 | McKee | 108/44 |
| 5,207,162 A * | 5/1993 | Mismas | 108/65 |
| 5,390,609 A * | 2/1995 | McKee | 108/45 |
| 5,577,458 A | 11/1996 | Kohl | |
| 5,730,065 A * | 3/1998 | Smith | 108/44 |
| 6,053,781 A | 4/2000 | Littleton | |
| 6,101,966 A | 8/2000 | Cumisky | |
| 6,273,005 B1 * | 8/2001 | Wehrmeyer | 108/42 |
| 6,367,403 B1 * | 4/2002 | Carter | 114/343 |
| 6,412,741 B1 * | 7/2002 | Olivero | 248/313 |
| 6,574,911 B1 | 6/2003 | Hurst et al. | |
| 6,926,240 B2 * | 8/2005 | Goeller | 108/152 |
| 6,932,019 B1 | 8/2005 | Tennant | |
| 7,114,452 B1 * | 10/2006 | Owen | 108/44 |
| D629,016 S | 12/2010 | Brooks et al. | |
| 7,922,016 B1 * | 4/2011 | Domenig et al. | 211/144 |
| 7,946,609 B2 * | 5/2011 | Johnson et al. | 280/652 |
| 8,015,929 B2 * | 9/2011 | Tyner | 108/42 |
| 8,136,458 B1 * | 3/2012 | Cass et al. | 108/42 |
| 8,166,905 B2 | 5/2012 | Gratsch | |
| 8,397,648 B1 * | 3/2013 | Palladino | 108/42 |

* cited by examiner

*Primary Examiner* — Jose V Chen
(74) *Attorney, Agent, or Firm* — Saliwanchik, Lloyd & Eisenschenk

(57) ABSTRACT

The embodiments of the subject invention pertain to a workstation for attachment to a trolling motor. The workstation comprises a cowl for covering the head of a trolling motor and a shaft collar for operable attachment of the cowl to a trolling motor shaft. The workstation can remain in place on a trolling motor even when stored on the deck of a boat. Various accessories can also be attached to the cowl.

47 Claims, 7 Drawing Sheets

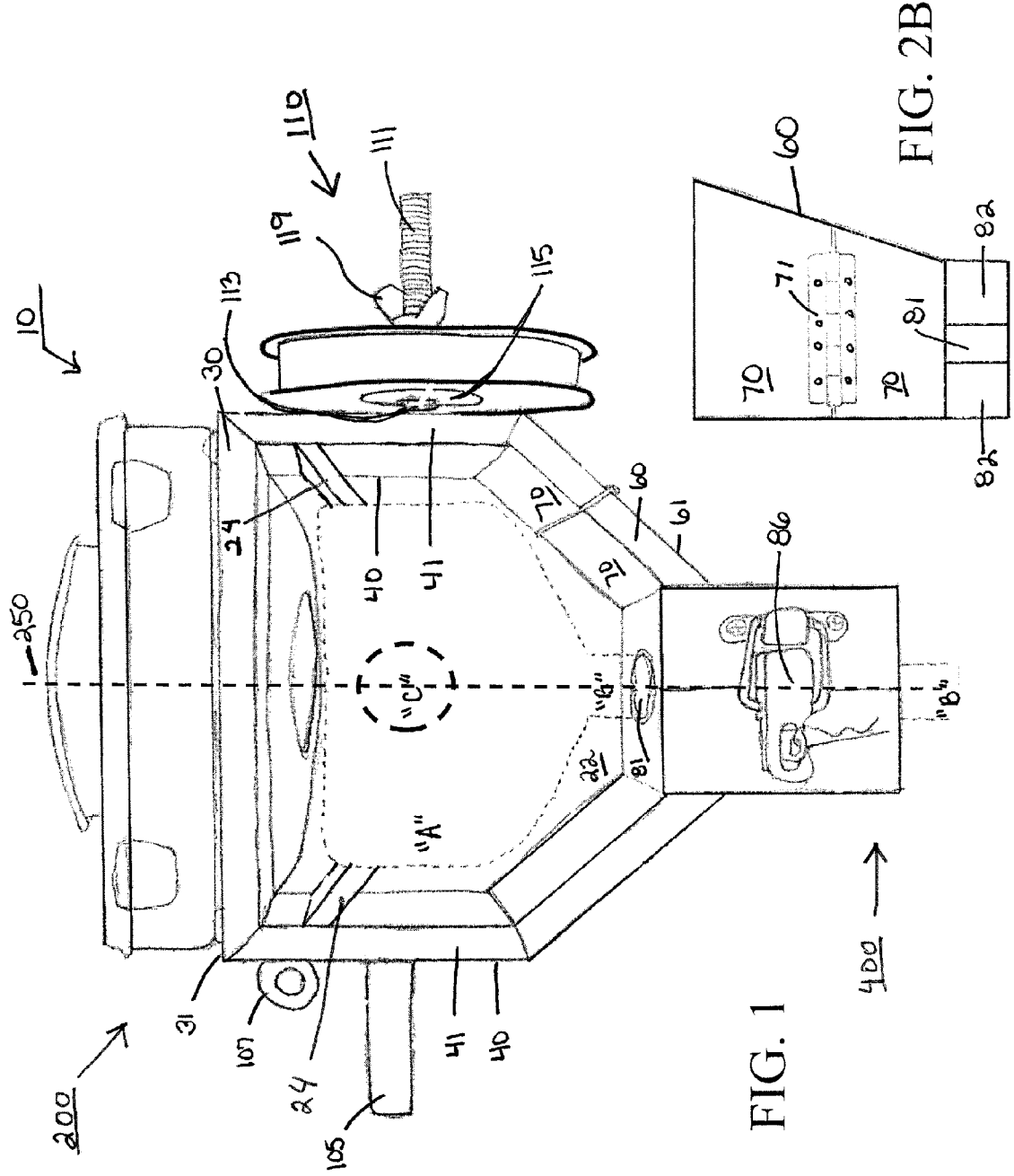

TROLLING MOTOR RIGGING STATION

CROSS-REFERENCE TO RELATED APPLICATION

The present application claims the benefit of U.S. Provisional Application Ser. No. 61/630,190, filed Dec. 6, 2011, which is hereby incorporated by reference herein in its entirety, including any figures, tables, or drawings.

BACKGROUND OF INVENTION

The fishing industry is inundated with accessories and apparatuses that can increase the comfort of the time spent on the water by anglers of all ability levels. Examples of these accessories and apparatuses include a myriad of designs for tackle boxes, cup holders, fishing line transfer assemblies, rod holders, and pliers or other tool holders. Yet, with all of these accessories there has yet to be one that addresses all of these needs in one location on a boat while maintaining functional effectiveness. Usually, while fishing, there are a variety of spontaneous actions and activities that are performed such as, for example, changing lures or hooks, transferring fishing line from a spool to a fishing reel, cutting fishing line, preparing bait, removing lures from fish, securing a rod, or drinking a beverage. Performing the various activities associated with fishing usually requires an angler to move to different areas of the boat. This can be particularly problematic for an angler located in the bow of a boat who most often controls an electric trolling motor for navigation.

Numerous devices have been devised that attach to different components on a boat to provide additional surface area and workstations to perform these various activities. There are devices that can be attached to gunwales to provide bait cutting or work surfaces, covers for ice coolers to provide usable work space, mounted tackle boxes, attachments for holding often-used tools, fishing line holders, cup holders, and even boat attachments that can increase deck space. However, most of these devices are used for a single purpose and cannot accommodate multiple activities without inconveniencing an angler.

Such attachment devices are also often designed to affix to areas where they do not interfere with fishing, which means that they are not usually easily accessible during fishing. If they are conveniently located, they often utilize premium deck space or interfere with the process of fishing. There is no known device that can accommodate the multiple activities of an active angler that is conveniently located and stable enough to remain in place at all times while on the water.

BRIEF SUMMARY

The subject invention provides a device that accommodates multiple activities associated with fishing, provides convenient access to tools and gear associated with fishing, and does not interfere with normal fishing activities. Embodiments of the invention utilize an area of a boat that has not previously been used for this purpose and that is easily accessible to an angler. The device is portable, easily installed, and maintains a stable and secure attachment.

In particular, the subject invention provides a novel, inexpensive, and highly effective device for utilizing a trolling motor as a workstation. Embodiments of the invention include a cowl that goes over a trolling motor housing and attaches to the shaft of the trolling motor. The cowl can have various features and attachments that pertain to or facilitate the various activities related to fishing. Advantageously, the workstation does not interfere with the operation of a trolling.

Specific embodiments of the subject invention include accessories attached to the cowl that secure various devices or materials used with fishing or for the convenience of an angler. The cowl is easily attached and removed from a trolling motor and does not require any modifications to a trolling motor or a boat for use. The devices of the subject invention can be used with various styles of trolling motors and the securing mechanisms can be adjusted for various size trolling motor shafts. Other embodiments of the subject invention provide various attachment sites and mechanisms on the cowl, so that various accessories can be attached and/or removed as desired.

Other aspects and further scope of applicability of the present invention will become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be shown to actual scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 1 is a rear elevation view of an embodiment of the subject invention.

FIG. 2B is a left side view of the hinge portion of the embodiment shown in FIG. 2A.

DETAILED DISCLOSURE

Figure 2A:
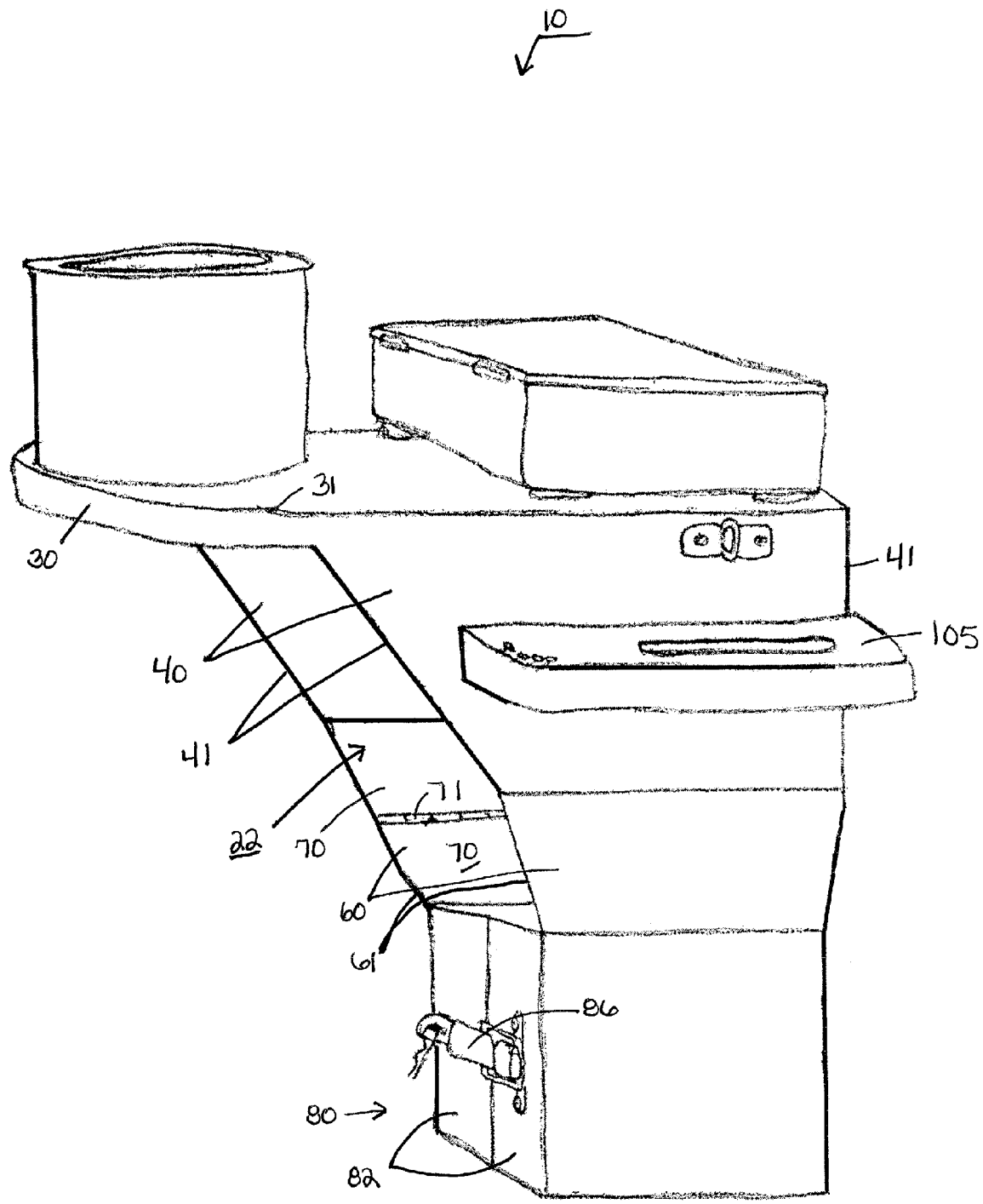
FIG. 2A is a front right perspective view of the embodiment shown in FIG. 1.

The subject invention describes embodiments of a portable multi-task workstation. More specifically, the subject invention provides embodiment(s) of a workstation with multiple attached or attachable devices and apparatuses that can be used for, or while, fishing. The workstation can be attached to an existing structure on a boat, specifically, a trolling motor. Advantageously, the embodiments of the workstation of the subject invention permit an angler navigating a boat with a trolling motor to conveniently access materials and devices used during fishing without leaving the trolling motor unattended.

An embodiment of the invention utilizes a cowl to which any of a variety of accessories, apparatuses, fixtures, or structures can be attached or incorporated. The cowl can include at least one arm that extends to attach to the shaft of a trolling motor. Ideally, the shape of the cowl permits it to be used on any make or style of trolling motor, since the only requirement is that a shaft collar be capable of making operable connection with a trolling motor shaft. Because the workstation can be operably connected to a trolling motor, it can remain attached even when the trolling motor is retracted and secured to the deck of a boat. Typical trolling motors are slidably affixed to a bracket that allows them to be secured to the deck when not in use and to be tilted over the side of a boat when needed. Thus, as long as the trolling motor is properly secured, the workstation can also be secured. A further advantage of the workstation is that it has no impact on the ability to use a trolling motor and it makes use of a space already occupied by the trolling motor, so it has minimal impact on deck space.

The following description will disclose that the subject invention is particularly useful in the field of fishing, in particular fishing from a boat that utilizes a trolling motor, or similar device. However, a person with skill in the art will be able to recognize numerous other uses that would be applicable to the devices and methods of the subject invention. While the subject application describes, and many of the terms herein relate to, fishing and/or boating, uses requiring modifications that would be apparent to a person with skill in the art and having benefit of the subject disclosure are contemplated to be within the scope of the present invention.

In the description that follows, a number of terms pertaining to fishing and boating are utilized. In order to provide a clear and consistent understanding of the specification and claims, including the scope to be given such terms, the following definitions are provided.

The term "fishing" as used herein is merely for literary convenience. As used herein the term fishing is a general reference to any activity that can be done on or around a boat or other water-going vessel. The term should not be construed as limiting in any way. The devices, apparatuses, methods, techniques and/or procedures of the subject invention could be utilized by any person desiring or needing to do so and having the necessary skill and understanding of the invention.

The term "trolling motor" as used herein is also for literary convenience. The term most often refers to any of a multitude of self-contained marine propulsion systems that can include, among other features, an electric motor, propeller, and manual or remote controls. However, the use of the term "trolling motor" herein should not be construed as limiting the invention in any way. It should be understood that any device having a structure or configuration that would allow attachment of one or more embodiments of a workstation of the subject invention (such as, for example, a pole) is considered to be within the scope of use of the subject invention.

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct or indirect, physical or remote.

Finally, reference is made throughout the application to the "proximal end" and "distal end." As used herein, the proximal end of the workstation is the area, when installed, that is furthest from the propeller or that end nearest the handle or the trolling motor head. Conversely, the distal end is the area of the workstation that, when installed, is closest to the trolling motor propeller or that end which affixes to the trolling motor shaft.

The present invention is more particularly described in the following examples that are intended to be illustrative only, since numerous modifications and variations therein will be apparent to those skilled in the art. As used in the specification and in the claims, the singular for "a," "an" and "the" include plural referents unless the context clearly dictates otherwise.

The embodiments of the subject invention will be more clearly understood by also having at least a rudimentary understanding of the function of a trolling motor. A trolling motor is a type of marine propulsion unit that affixes to the bow, or less commonly the stern, of a motor boat usually with a bracket and rail system. A typical trolling motor comprises an electric motor, often referred to as the head "A" of the trolling motor, attached to a long shaft "B" with a propeller at the opposite end that goes into the water. Most trolling motors are manually controlled with a handle "C" attached to the electric motor that is simply pushed to the left or right to navigate in the desired direction. Although recent advancements have improved trolling motors to allow for either remote controlled or foot pedal steering. These advancements still operate by simply rotating the propeller in the desired direction. Trolling motors are usually not the main source of propulsion for a boat, but are used for more precise navigation over short distances, particularly when fishing. When the main boat engine is in use, a trolling motor is often lifted from the water to reduce drag. The bracket and rail system allows the trolling motor to be easily raised and then tilted, so that the shaft is substantially parallel with the deck and so that the trolling motor is secured and out of the way when not in use.

Figure 4:
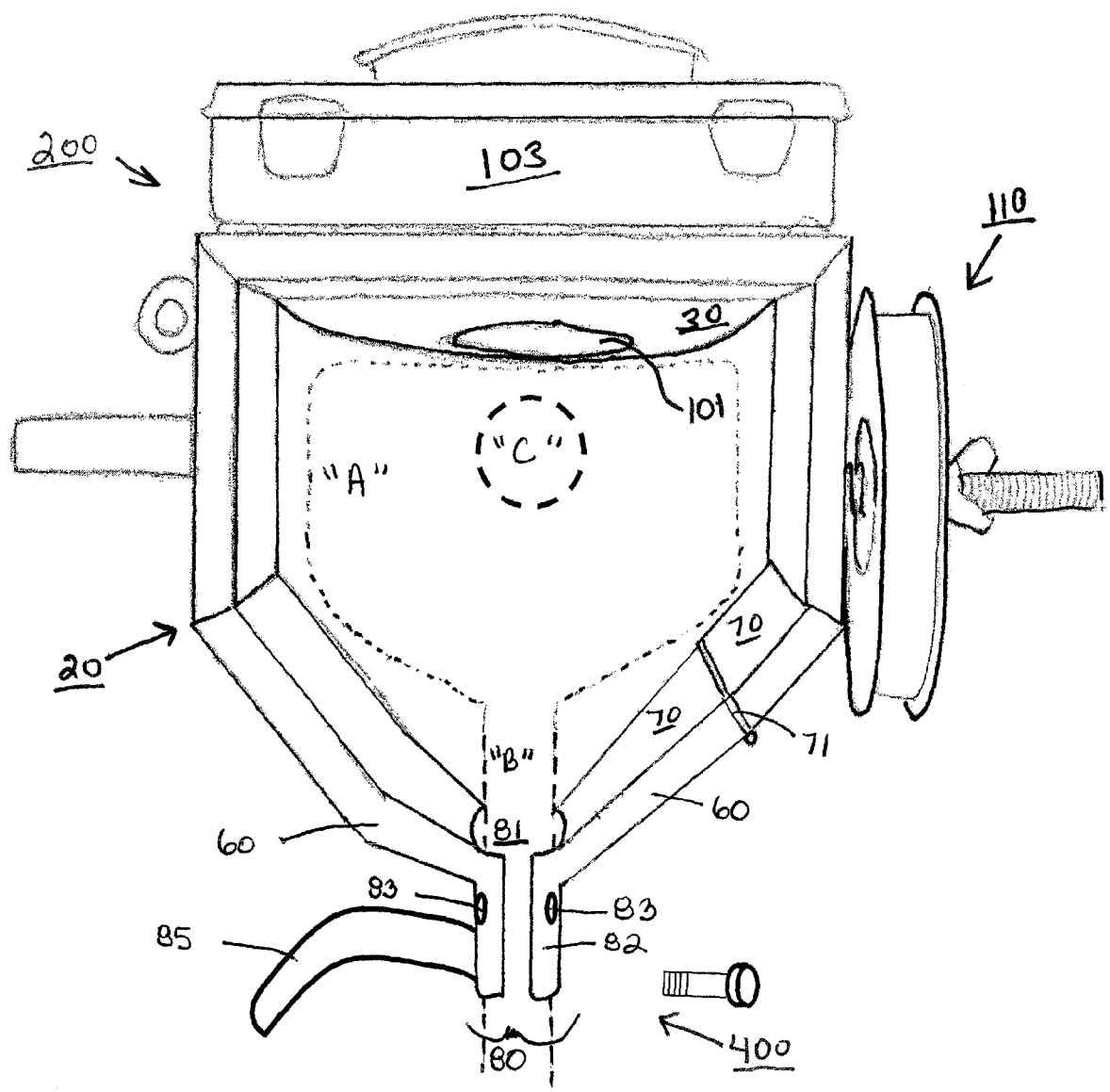
FIG. 4 is a rear elevation view of an embodiment of the subject invention illustrating an alternative embodiment of a shaft collar.

Reference will be made to the attached figures on which the same reference numerals are used throughout to indicate the same or similar components. With reference to the attached figures, which show certain embodiments of the subject invention, it can be seen that a workstation 10 of the subject invention comprises a cowl 20 that includes a platform 30 with at least one sidewall 40 extending distally from the platform. In a further embodiment, there is at least one arm 60 extending from a sidewall that can be directed towards the center of the cowl. Attached to the at least one arm of the cowl is a shaft collar. A shaft collar can have at least two sections, where each section is attached to at least one arm on each sidewall. FIGS. 1 and 4 illustrate exemplary embodiments of the subject invention. In use, the workstation is placed with the cowl over the head "A" of a trolling motor so that the arms extend towards the shaft "B" and the shaft collar can be attached around the shaft.

With regard to the cowl 20, there can be at least three general components that form an embodiment of a cowl of the subject invention. The first component is a platform 30 located at or about the proximal end 200 of the workstation 10. In one embodiment, the platform is substantially flat and provides a planar surface. However, the platform can alternatively have a form that is convex or concave or some combination thereof, depending upon the intended use of the workstation.

Figure 5:
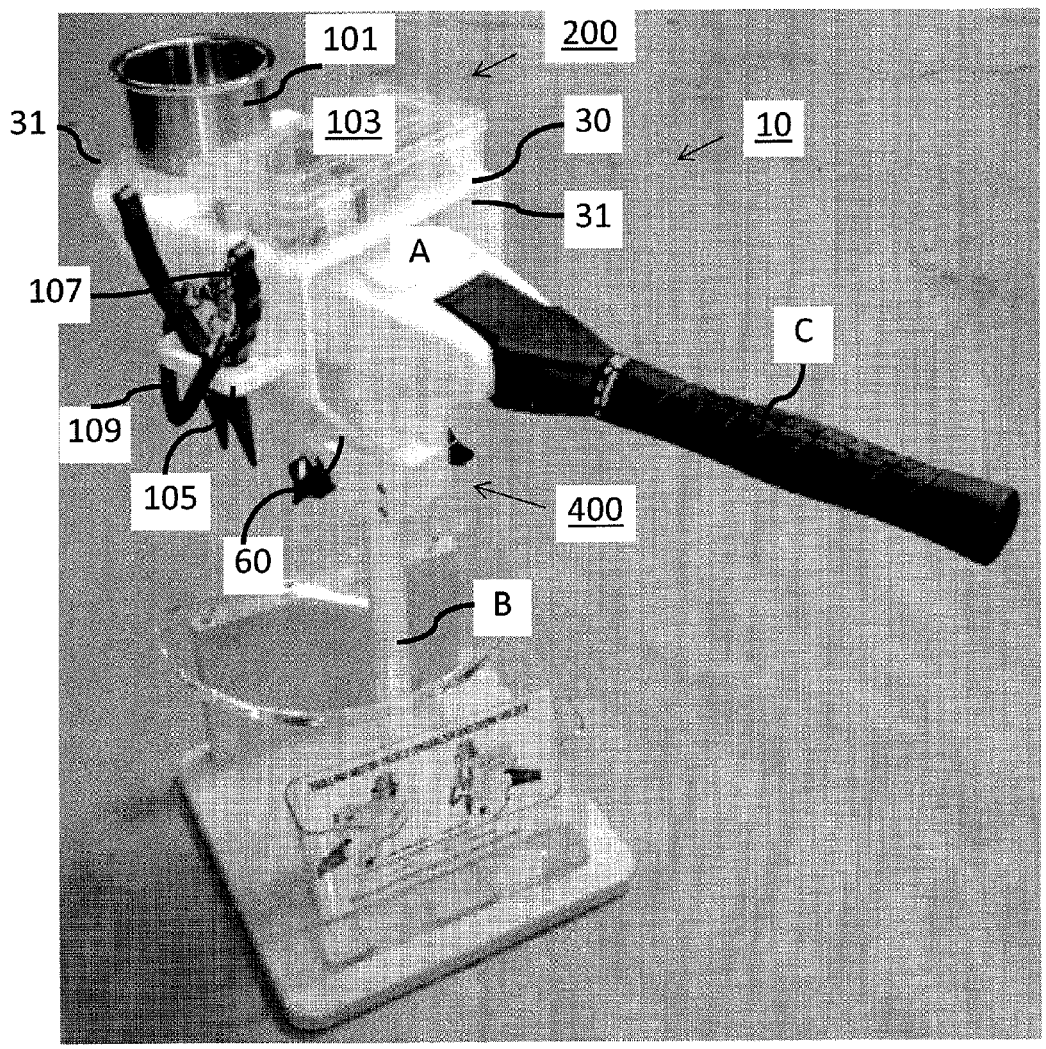
FIG. 5 is a right rear perspective view of an alternative embodiment of the subject invention. This view shows the embodiment attached to the shaft of a mock trolling motor stand.

The circumferential shape or outside edge 31 of the platform can also vary depending upon, for example, the expected use. Ideally, the circumferential shape of the platform will be conducive to attachment of one or more accessories and will not inhibit placement of the trolling motor against the deck of a boat. Such circumferential shape can include, by way of non-limiting examples, square, rectangular, triangular, trapezoidal, oval, round, or any other polygonal shape. In a particular embodiment, the platform has four outside edges 31, wherein at least one is curved, such as shown, for example, in FIG. 3. In a further embodiment, at least one edge overlaps the head of a trolling motor, an example of which is shown in FIGS. 2A and 5. However, it would be within the skill of a person trained in the art, having benefit of the subject disclosure, to determine any of a variety of configurations for a platform. Such alternatives are considered to be within the scope of the subject invention.

The second component of a cowl can be one or more sidewalls 40 that extend from the platform. In a particular embodiment, a sidewall extends from the outside edge 31 of the platform. In one embodiment, a sidewall has a form that is substantially planar, such as shown, for example, in FIGS. 1 and 5. In an alternative embodiment, a sidewall has a form with one or more curves, bends, or folds, such that a sidewall is not planar. The circumferential shape 41 of a sidewall can also vary and can include, by way of non-limiting examples, square, rectangular, triangular, trapezoidal, oval, circular, or any other polygonal shape. It should be understood that where more than one sidewall is utilized, each can have a different form or circumferential shape. Ideally, the shape of a sidewall will be conducive to attachment of one or more accessories and will not inhibit placement of a trolling motor against the deck of a boat.

In one embodiment, there is at least one sidewall 40 that extends from a platform. In an alternative embodiment, there are at least two sidewalls that extend from the platform. In a further embodiment, the at least two sidewalls extend from different sides of the platform. In a more specific embodiment, the at least two sidewalls extend from at or about approximately opposite sides of the platform. In another alternative embodiment, there are at least three sidewalls. In a further embodiment, the at least three sidewalls extend from different sides of the platform. In a still further embodiment, at least two sidewalls extend from different sides of the platform and a third sidewall extends between the first two sidewalls and from a different side of the platform. It would be within the skill of a person trained in the art and having benefit of the subject disclosure to determine any of a variety of combinations of one or more sidewalls for the embodiments of the subject invention. It is to be understood that such modifications, which perform the same function, in substantially the same way, with substantially the same result, are within the scope of the subject invention.

Figure 6:
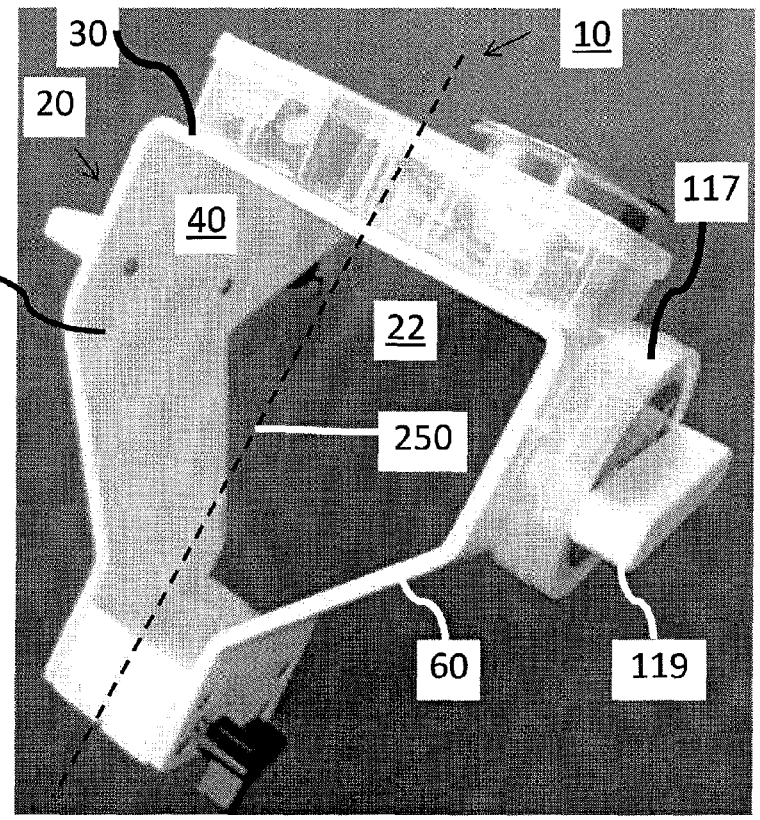
FIG. 6 is a rear perspective view of the embodiment shown in FIG. 4, unattached to the mock trolling motor.

The third component of a cowl can be at least one arm 60, extending from at or about the distal end of a sidewall. In general, an arm can be an extension of, or from, a sidewall, such that it can be a contiguous part of the sidewall or can be a separately attached component from the sidewall. In one embodiment, the arm facilitates attachment of the cowl 20 to the trolling motor shaft "B." As an extension of the sidewall, an arm can extend distally. To accommodate attachment of the workstation, an arm can also have at least a portion thereof that bends, curves, angles, or is otherwise directed at or generally towards a proximal-to-distal center line 250 of the workstation 10, an example of which is shown in FIGS. 1 and 6. Alternatively, an arm can be semi-rigid or flexible, so that it can be forcibly moved towards the proximal-to-distal center line.

There can be any number of arms attached to or extending from one or more sidewalls. In one embodiment, there is at least one arm extending from one sidewall, such that the single arm facilitates attachment of the cowl to the shaft "B." In another embodiment, there is at least one arm extending from each of two or more sidewalls, such that each arm facilitates attachment of the cowl to the shaft. In a further embodiment, there is at least one arm extending from each sidewall located on generally opposite sides of the workstation, where each arm facilitates attachment of the cowl to the shaft. In a specific embodiment, there are two sidewalls extending from the platform and one arm extending from each of the two sidewalls. It would be within the skill of a person trained in the art and having benefit of the subject disclosure to determine any of a variety of combinations of one or more arms for the embodiments of the subject invention. It is to be understood that such modifications, which perform substantially the same function, in substantially the same way, with substantially the same result, are within the scope of the subject invention.

As with the platform and the sidewall embodiments, the form of an arm 60 can vary. In one embodiment, an arm has a form that is substantially planar, such as shown, for example, in FIGS. 1, 2A, 5, and 6. In an alternative embodiment, the form of an arm has one or more curves, bends or folds, such that an arm is not planar. The circumferential shape 61 of the arms can also vary and be, by way of non-limiting example, square, rectangular, triangular, trapezoidal, oval, circular, or any other polygonal shape. It should be understood that where one or more arms are utilized, each can have a different form or circumferential shape. Ideally, the form and/or circumferential shape of an arm will be conducive to attachment of one or more accessories and/or attachment of the cowl to a shaft "B" and, further, will not inhibit placement of a trolling motor against the deck of a boat.

The embodiments of the three components described above, a platform 30, one or more sidewalls 40, and one or more arms 60, when combined define a cowl 20 according to the subject invention. The arrangement of these components can provide space or cavity 22 into which can be disposed the head "A" of a trolling motor. Thus, a cowl is substantially a covering for a trolling motor head "A" and, possibly, at least part of the proximal end of the shaft "B." The at least one sidewall and the at least one arm can act as supports for the platform. FIGS. 1 and 4 illustrate examples of a cowl with a trolling motor head "A" disposed therein.

As mentioned above, the form and circumferential shape of the cowl components can vary. The embodiments shown in the figures herein illustrate components that are substantially planar. However, alternative embodiments can have one or more components that have a rounded or more curved shape. Thus, embodiments of the cowl can be more or less rounded, can conform to the shape of a specific type or style of trolling motor, or can be configured to operate with a particular type or style of vessel. A person with skill in the art, having benefit of the subject disclosure, would be able to determine any of a variety of alternative cowl configurations. It should be understood that such variations, which perform the same function, in substantially the same way, with substantially the same result, are within the scope of the subject invention.

Likewise, the dimensions of the components can also vary. It can be preferable for the cowl dimensions to be such that various accessories can be attached to one or more of the components. Another advantage of the embodiments of the subject invention is the ability of the cowl to protect the head of a trolling motor. It is not uncommon, due to their placement, for trolling motors to suffer abuse and extreme conditions. They often get bumped or hit and even dropped when being placed on the deck of a vessel. Many are exposed regularly to all types of weather conditions. At the least, such incidences can damage the housing covering the head of a trolling motor and often can cause internal damage. The cowl can act as a means of protection for the head "A." Therefore, it can be beneficial for the dimensions of the cowl to be such that it sufficiently covers and protects a trolling motor head. It can be most efficacious if a cowl configuration is such that protects a trolling motor head and provides sufficient area or space to attach any of a variety of one or more desired accessories.

Typically, a cowl can comprise a rigid or semi-rigid material. Such materials can include, but are not exclusive to, fiberglass, wood or wood products, metals, plastics, nylons, ceramics, and various composites thereof. It can be beneficial if such materials are waterproof, weather proof and/or resistant to corrosion, particularly by saltwater. A multitude of factors can be considered by those skilled in the art with regard to the choice of materials for one or more of the components of the subject invention. Such variations in materials are within the scope of the subject invention.

The cavity 22 of the cowl can also include one or more support structures 24 therein that inhibit the effects of vibration and/or torque on the components, or that can minimize or inhibit contact of the cowl with the trolling motor head. In one embodiment, a support structure within a cavity comprises one or more pads, buffers, cushions, or other shock absorbing devices that are disposed between the cowl and a trolling motor head when the cowl in emplaced thereover. In another embodiment, a support structure within a cavity is one or more legs, braces, struts, springs, or other rigid or semi-rigid device that abuts the components and the trolling motor head, to reduce movement of the cowl relative to the trolling motor head. There are a variety of support structures 24 that can be utilized within the cavity 22 to absorb shock or inhibit motion or contact with the trolling motor head that would be known to a person skilled in the art. Substitution of support structures other than those mentioned here are considered to be within the scope of the subject invention.

To be effective, a workstation 10 of the subject invention should be securely attached to a trolling motor. Such attachment can include direct or indirect attachment to the trolling motor head or other features, such as the shaft, of the trolling motor. It should be noted that such attachment would preferably not interfere with the operation or storage of a trolling motor. Such attachment can also permit a workstation to remain in place on a trolling motor even when the trolling motor is in operation or stored against the deck of a vessel. The attachment could be permanent, whereby the workstation is affixed to a trolling motor with one or more non-removable devices or apparatuses, such as, for example, adhesive products, putties, glues, or the like. The attachment could be semi-permanent whereby the workstation is affixed to a trolling motor with screws, bolts, brackets, or other like devices that attach directly to the trolling motor, usually requiring some modification to the trolling motor. However, it can be preferable to make use of options that allow the cowling to be used without modification or damage to the trolling motor. Such attachment can ideally be easy to use and provide a secure removable hold. It can also be configured as part of the cowl, or be a separate removable part.

In embodiment, the cowl is operably connected to or around the trolling motor shaft "B." In a further embodiment, such attachment is not permanent and allows the workstation to be removed when desired without modification or damage to the trolling motor. With this embodiment, one or more arms are extended distally and have at least a portion thereof that bends, curves, angles, or is otherwise directed at or generally towards a proximal-to-distal center line 250 of the workstation 10, as described above. A shaft collar 80 can be affixed at or about the distal end of the arms that are closest to the center line 250 and can operably connect to or around the shaft "B."

Figure 8:
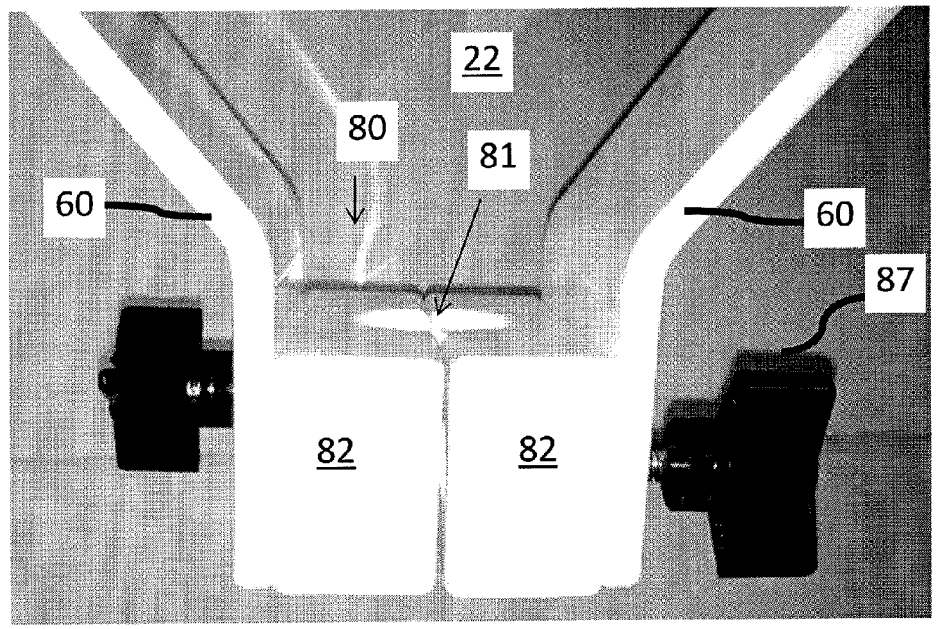
FIG. 8 is a front elevation view of the shaft collar of the alternative embodiment shown in FIG. 5.
Figure 9:
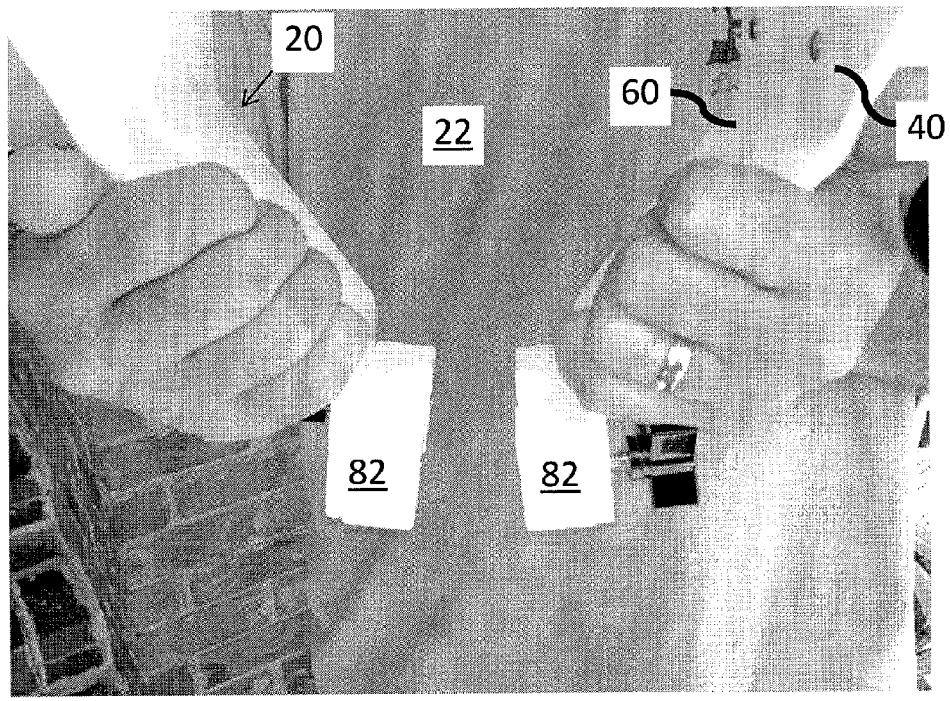
FIG. 9 is a photograph showing how each biased arm of the shaft attachment collar shown in FIG. 7 can be manually separated for attachment around a trolling motor shaft.

In one embodiment, a shaft collar has at least a portion thereof shaped to conform to a shaft, an example of which is shown in FIG. 4. Alternatively, the shaft collar does not conform to the shaft, but can make an operable connection. In a further embodiment, the shaft collar has a bifurcated channel 81 at or about the proximal-to-distal center line 250 that can be placed around a shaft, as shown, for example, in FIGS. 1, 8, and 9. By way of non-limiting example, the shaft collar can have a circular or tubular shape, such as shown, by way of non-limiting example, in FIG. 4, that is compatible with at least a portion of a shaft. By way of further non-limiting example, the shaft collar can have any shape, but can include some part thereof, such as a bifurcated channel 81 that conforms to at least part of the shape of a shaft, such as shown, by way of non-limiting example, in FIG. 4. This can include a semi-circular cut-out portion that can conform to at least a portion of a shaft, an example of which is shown in FIGS. 1, 8 and 9. In another embodiment, a pliable, elastic, resilient, or otherwise shape conforming material or device can be utilized with a shaft collar to conform to the shape of a shaft.

In one embodiment, a shaft collar 80 is a bracket-like structure comprising two or more sections 82. Each section can be attached to an arm 60 and aligned, so that the shaft collar sections can encircle at least a portion of a trolling motor shaft "B." In a particular embodiment, the alignment of the shaft collar ensures that the platform 30 of the cowl 20 is substantially horizontal when a trolling motor is in operation. FIGS. 1, 4, and 5 illustrate non-limiting examples of a shaft collar, according to the subject invention, having two sections 82. Alternative embodiments can have a shaft collar with three or more sections. In specific embodiments, the cowl has three or more arms with a shaft section attached to each.

The shaft sections 82 can be operably connected to a shaft "B" by permanent or non-permanent devices and methods. It can be preferable for either such connection to secure at least one of the shaft sections to the shaft so as to prevent horizontal and vertical movement and/or rotation about the shaft. A person with skill in the art would be able to recognize any of a variety of devices and/or methods by which an operable connection can be made between a shaft collar section 82 and a trolling motor shaft "B." Such variations, which perform substantially the same function, in substantially the same way, with substantially the same result, are considered to be within the scope of the subject invention.

In one embodiment, the shaft and a least one section 82 have compatible openings 83 for receiving a bolt, screw, pin, or similar device, such as shown, for example, in FIG. 4. In another embodiment, one or more adhesive devices or materials is utilized to operably connect at least one section to a shaft. In yet another embodiment, a shaft "B" is modified to receive and secure one or more collar sections 82.

Because of the variability of trolling motor styles and configurations, it can be preferable for a workstation to have an operable shaft connection that is universal. Further, trolling motors are often removed for replacement or repair. Thus, a permanent connection could be problematic for making some repairs, or if it was desired to use the workstation on a different trolling motor.

In one embodiment, one or more band fasteners 85 are used to apply pressure to one or more collar sections 82 around a shaft. A band fastener can be any sufficiently elongated device that can be looped or wrapped around, or otherwise encircle one or more collar section, and be tightened to apply pressure against the shaft. Examples of a band fastener can be, by way of non-limiting example, a cable tie, zip tie, tie wrap, clamps, hook and pile strips (a.k.a., VELCRO strips), belts, and similar such devices. FIG. 4 illustrates an embodiment of a collar section that can be connected and tightened around a shaft with a band fastener 85.

In another embodiment, one or more clasps 86 are used to pull the collar sections together, and/or apply pressure, around a shaft. There are a multitude of clasps that are commonly used for applying tension to hold devices together. Such non-limiting examples are swing clamps, wire clamps, lightening closures, bale closures, and other similarly functioning devices. In one embodiment, one or more clasps are arranged on one or more collar sections. When the clasps are engaged, the collar sections are drawn together and against the shaft. When it is desired to remove a workstation, a clasp can be unengaged and the workstation removed from the shaft and/or trolling motor with minimal effort and no alteration to the trolling motor. FIGS. 1 and 2A illustrate examples of shaft collars with clasps positioned on two collar sections, so as to bring the two collar sections together when the clasp components are engaged. In a further embodiment, a clasp can be lockable, to prevent unwanted removal of the workstation.

Figure 7:
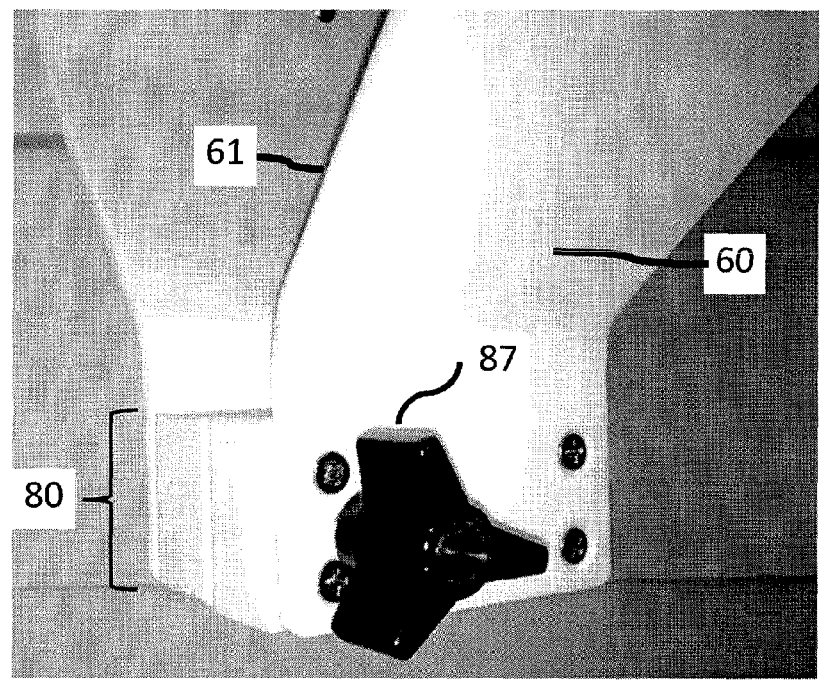
FIG. 7 is a rear perspective view of the shaft attachment collar of the alternative embodiment shown in FIG. 5.

Still another embodiment utilizes one or more threaded fasteners 87 to connect two or more collar sections 82 to a shaft "B." A threaded fastener can be any of a variety of devices, including, but not limited to, screws, bolts, pins, nuts, washers, or combinations thereof. In one embodiment, two or more shaft sections 82 have openings or bores therein to receive a threaded fastener 87. In a further embodiment, the threaded fastener can be used to draw the collar sections closer together around a shaft, causing the collar sections to apply tension to the shaft, which holds the collar sections in place. FIGS. 7 and 8 illustrate examples of threaded fasteners with attached handles that can be utilized to connect and secure two or more collar sections.

As described above, a workstation is positioned on a trolling motor with the cowl over the head "A" of a trolling motor, so that the arms extend towards the shaft "B" and the shaft collar can attach around the shaft. This can necessitate that the shaft collar 80 and/or the collar sections 82 be at least slightly separable, so that the shaft collar and/or the collar sections can be moved around and placed against the shaft. Therefore, it can be beneficial if the workstation is configured or designed to accommodate such positioning. Ideally, the positioning of the workstation can be achieved with minimal effort and can preferably be done with the trolling motor attached or unattached to a boat. One way of accomplishing this is to have a sidewall and/or an arm configured, so that the shaft collar or one or more collar sections can be moved away from the center line 250 of the workstation.

In one embodiment, a sidewall and/or arms can be jointed into two or more sections 70. The jointed sections can swing or rotate sufficiently away from the center line 250 of the workstation so that the shaft collar or collar sections, attached thereto, can move away from the center line. The jointed sections can be attached by any device or method that provides the necessary rotation. In one embodiment, two or more sections can be attached by one or more hinges 71 therebetween. FIGS. 2B and 4 illustrate embodiments having an arm 60 with two jointed sections 70 attached by a hinge that allows the distal-most section 70 to rotate away from the center line 250. In an alternative embodiment, an arm and a sidewall are jointed with a hinge therebetween. The jointed section can be rotated away from the center line, so that the cowl can be placed over the trolling motor head by sliding the trolling motor head into the cavity 22. The jointed section can be rotated back towards the center line and operably connected to the shaft, as discussed above. It would be within the skill of a person trained in the art and having benefit of the subject disclosure to determine any of a variety of devices for joining jointed sections according to the embodiments of the subject invention. It is to be understood that such modifications, which perform the same function, in substantially the same way, with substantially the same result, are within the scope of the subject invention.

In another embodiment, one or more components of the workstation can be comprised of a sufficiently flexible material. Typically, the shaft "B" of a trolling motor has a diameter of between approximately 0.75 inch and approximately 3 inches, with an approximately 1.0 inch diameter being most common. Therefore, it can be helpful if the shaft collar and/or the collar sections can be sufficiently separated to accommodate passage of the shaft into the shaft collar 80. In one embodiment, the sidewalls and arms comprise a material that is sufficiently rigid enough to maintain the shape and functionality of a workstation, but also has sufficient flexibility that the arms and/or sidewalls can be forcibly pulled apart so that a shaft can be placed within a shaft collar. In one embodiment, the workstation comprises a plastic material that maintains a rigid shape, but also allows the sidewalls and/or arms to be forcibly pulled apart to accommodate a shaft passing therebetween. In another embodiment, the sidewalls and arms, or portions thereof, comprise less material or have a thinner construction allowing them to be more flexible. FIG. 6 illustrates an embodiment where the sidewalls and arms are formed so that the distal ends 400 of the arms are biased towards the center line 250. FIG. 9 illustrates the same embodiment with the arms and sidewalls being forcibly separated so that they can temporarily allow a shaft "B" to pass between collar sections 82. In one embodiment, a sidewall and/or arm can be forcibly returned to an original position, with the shaft collar at or near the center line, after being forcibly pulled apart. In another embodiment, a sidewall and/or arm is biased towards the center line, such that when not being forcibly pulled apart, they return to an original position with the shaft collars at or near the center line.

Figure 3:
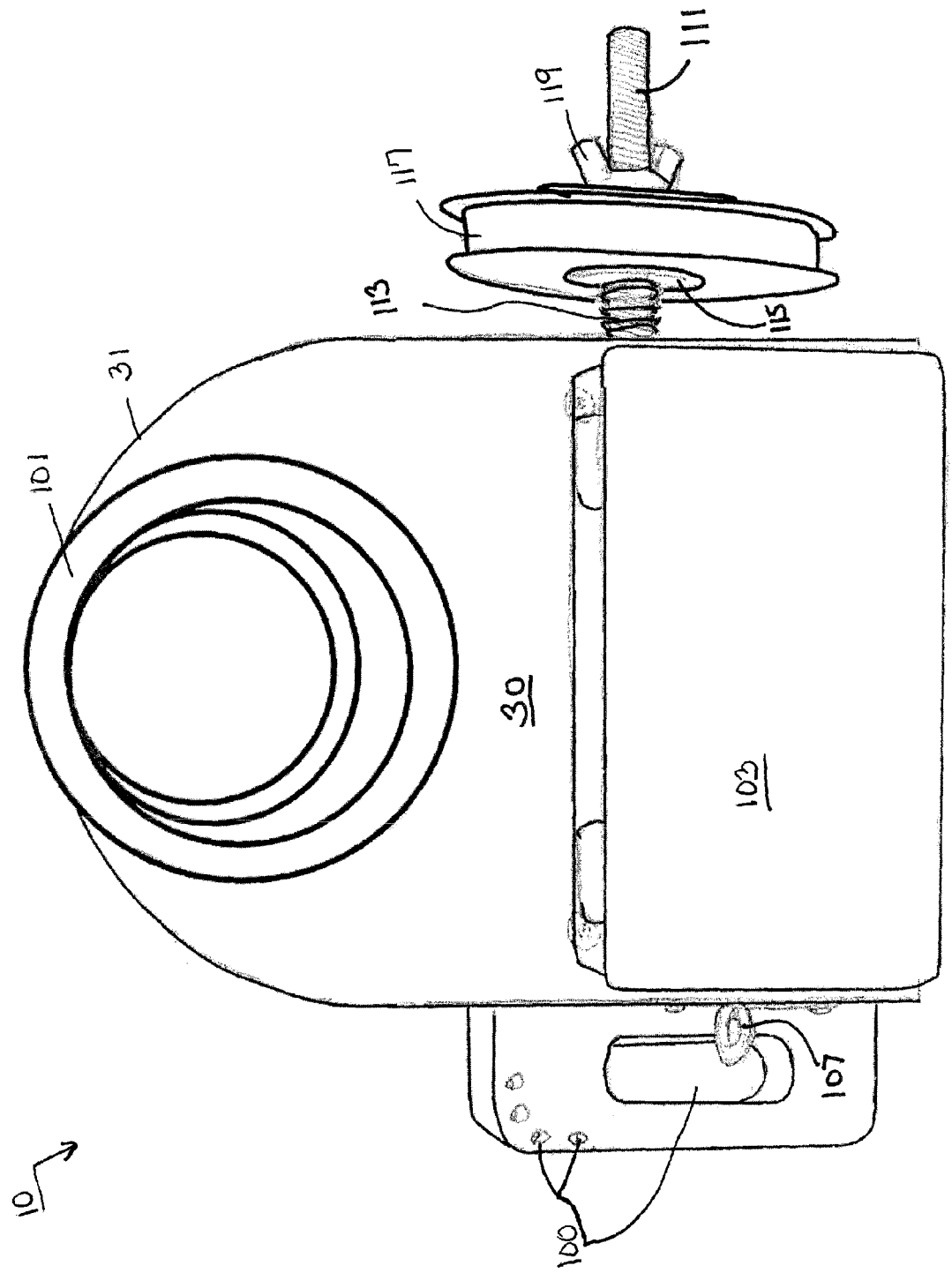
FIG. 3 is a top planar view of an embodiment of the subject invention.

Advantageously, the workstation provides one or more surfaces to which various accessories 100 can be operably attached. By way of non-limiting example, the platform 30 can be configured with accessories that are preferably maintained in a vertical position when the trolling motor is in use. By way of non-limiting example, a drink holder 101 and a utility box 103, for tools or tackle, can be affixed to the platform, such as shown in FIGS. 2A, 3 and 5. The sidewalls can also be utilized as surfaces for attachment. By way of further non-limiting example, a tool shelf 105 with openings 106 for holding various tools, such as pliers, screwdrivers, hooks, de-hooker devices, etc., can be affixed to a sidewall. An attachment hook 107 can also be attached to the sidewall or to the tool shelf. A lanyard 109 can be affixed to a tool and to the attachment hook to ensure that the tool does not get lost or misplaced. A tubular rod holder can also be attached to the cowl. A pouch or bag for tool or tackle storage can also be attached to the cowl.

In yet another non-limiting example, a line transfer assembly 110 can be attached to a sidewall. A line transfer assembly can be used to secure a spool, usually for fishing line, and allows the fishing line to be unwound from the spool as necessary. In a specific embodiment, the line transfer assembly can provide some tension on the spool to prevent undesired unwinding of the line. It can also be advantageous, when spooling line onto a reel, to have some tension on the line for more accurate spooling on a reel.

In one embodiment, a line transfer assembly comprises a rod 111 having one end operably connected to a sidewall 40, a compression coil 113, i.e., spring, placed over the second end of the rod. A further embodiment utilizes two or more washers 115 having central openings therein placed over the second end of the rod. A spool 117 can be placed between the two washers and a tensioning device 119 placed against the washer furthest from the sidewall, as shown, for example, in FIGS. 3 and 4. In one embodiment, the tensioning device is a winged nut that threads onto the rod. In one embodiment, the tensioning device can be used to push the two washers with the spool therebetween against the compression coil. Alternatively, the tensioning device can be placed directly against a spool on the rod and the spool placed directly against a compression coil. The tension applied to the spool, with or without washers in place, by the compression coil on one side and the tensioning device on the other inhibits the spool from turning unless line is forcibly pulled from the spool. The amount of tension can be adjusted by moving the tensioning device.

The accessories on a workstation can be fixedly or removeably attached. A person with skill in the art, having benefit of the subject disclosure, would be able to determine a multitude of accessories that can be operably connected to a workstation. This can include line transfer assemblies other than that described above. It is also within the skill of a person trained in the art to determine any of a variety of methods and devices for attaching accessories, either permanently or removably. It should be understood that such variations are within the scope of the subject invention.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and that various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

I claim:

1. A workstation device for attachment to a trolling motor, the workstation device comprising:
    a platform having at least one outside edge,
    at least two sidewalls, each with a distal edge, the sidewalls being attached at or in proximity to the at least one outside edge of the platform, such that the distal edge of each sidewall extends away from the platform;
    at least two arms, each with a distal end, and each of the at least two arms being operably attached to one of the at least two sidewalls, respectively, so that the distal end of each arm extends distally from a sidewall; and
    a shaft collar comprising at least two shall collar sections, wherein each shaft collar section is attached to one of the at least two arms and located distal to the sidewall,
    wherein the shaft collar is adapted to operably attach to a shaft of the trolling motor.

2. A workstation device according to claim 1, wherein the platform, the at least two sidewalls, and the at least two arms are configured to form a cowl over at least part of the trolling motor, and at least one arm extends towards a proximal-to-distal center line of the cowl.

3. A workstation device according to claim 2, wherein the at least two shaft collar sections are connectable to form a bracket-like structure that operably attaches around the shaft of a trolling motor.

4. A workstation device, according to claim 2, further comprising one or more support structures, such that when the cowl is positioned over a trolling motor, the one or more support structures are between the cowl and the trolling motor.

5. A workstation device, according to claim 4, wherein a support structure is a pad, cushion, spring, or other shock absorbing device.

6. A workstation device, according to claim 4, wherein a support structure is one or more legs, braces, struts, or other rigid or semi-rigid structure.

7. A workstation device according to claim 1, wherein at least one of the collar sections has at least a portion thereof adapted to conform to the shape of a trolling motor shaft.

8. A workstation device according to claim 7, wherein the shaft collar comprises a bifurcated channel for receiving a shaft.

9. A workstation device according to claim 7, wherein at least one shaft collar section comprises a shape conforming material.

10. A workstation device according to claim 7, wherein operable attachment of the shaft collar to the shaft is removable.

11. A workstation device according to claim 10, wherein the operable attachment comprises at least one band fastener, clasp, or threaded fastener for securing the shaft collar to the shaft.

12. A workstation device according to claim 10, wherein the at least two arms can be ten oraril separated for placement of the at least two collar sections around the shaft.

13. A workstation device according to claim 12, wherein at least one of the at least two sidewalls and at least two arms is jointed, such that at least one of the at least two arms is rotatable on at least one of the at least two sidewalls.

14. A workstation device according to claim 13, wherein the at least one jointed sidewall or arm allows the at least two collar sections to be separated for placement around the shaft.

15. A workstation device according to claim 12 further comprising one or more accessories operably attached to the workstation.

16. A workstation device according to claim 15 wherein one or more accessories are removably attached.

17. A workstation device according to claim 15, wherein at least one of the accessories is a line transfer assembly.

18. A workstation device according to claim 15, wherein at least one of the accessories is a utility box, drink holder, rod holder, tackle pouch, or attachment hook.

19. A workstation device according to claim 15, wherein at least one of the accessories is a tool shelf.

20. A workstation device according to claim 10, wherein at least one of the at least two sidewalls and the at least two arms comprises one or more of a rigid and a semi-rigid material.

21. A workstation device according to claim 20, wherein the rigid and semi-rigid material allows the arms to be temporarily forcibly separated for placement around the shaft.

22. A method for utilizing a trolling motor as a workstation comprising:
    affixing to the trolling motor a device comprising,
        a platform having at least one outside edge,
            at least two sidewalls, each with a distal edge, the sidewalls being attached at or in proximity to the at least one outside edge of the platform, such that the distal edge of each sidewall extends away from the platform;
            at least two arms, each with a distal end, each of the at least two arms being operably attached to one of the at least two sidewalls, respectively, so that the distal end of each arm extends distally from a sidewall; and
        a shaft collar comprising at least two shaft collar sections, where each shaft collar section is attached to one of the at least two arms and located distal to the sidewall, wherein the shaft collar is adapted to operably attach to a shaft of a trolling motor,
    operating the trolling motor, and
    utilizing the device.

23. A method according to claim 22, wherein the platform, the at least two sidewalls and the at least two arms are configured to form a cowl over at least part of the trolling motor, and at least one arm extends towards a proximal-to-distal center line of the cowl.

24. A method according to claim 23, wherein the at least two shaft collar sections, each attached to one of the two arms, are connectable to form a bracket-like structure that operably attaches around the shaft of a trolling motor.

25. A workstation device, according to claim 23, further comprising one or more support structures, wherein the method further comprises positioning the workstation device over the trolling motor, such that the support structures are between the cowl and the trolling motor.

26. A method according to claim 22, wherein at least the platform is substantially horizontal when the trolling motor is in use.

27. A method according to claim 26, wherein the device further comprises a line transfer assembly.

28. A method according to claim 26, wherein the device further comprises at least one accessory selected from a utility box, a tool shelf, a drink holder, a rod holder, a tackle pouch, and an attachment hook.

29. A method according to claim 28 wherein at least one accessory is removably attached to the device.

30. A method according to claim 22, wherein at least one of the shaft collar sections has at least a portion thereof adapted to conform to the shape of a trolling motor shaft.

31. A method according to claim 30, wherein the shaft collar comprises a bifurcated channel for receiving a shaft.

32. A method according to claim 30, wherein at least one shaft collar section comprises a shape conforming material.

33. A method according to claim 30, wherein operable attachment of the shaft collar to a shaft is removable.

34. A method according to claim 33, wherein the operable attachment comprises at least one of band fastener, clasp, or threaded fastener, for securing the shaft collar to the shall.

35. A method according to claim 33, wherein the at least two arms can be temporarily separated for placement of the at least two collar sections around the shaft.

36. A method according to claim 35, wherein at least one of the at least two sidewalls and the at least two arms is jointed, such that at least one of the at least two arms is rotatable on at least one of the at least two sidewalls.

37. A method according to claim 36, wherein the at least one jointed sidewall or arm allows the at least two collar sections to be separated for placement around the shaft.

38. A method according to claim 35, further comprising one or more accessories operably attached to the workstation.

39. A method according to claim 38, wherein the one or more accessories are removably attached.

40. A method according to claim 38, wherein at least one of the accessories is a line transfer assembly.

41. A method according to claim 38, wherein at least one of the accessories is a utility box, tool shelf, drink holder, rod holder, tackle pouch, or attachment hook.

42. A method according to claim 33, wherein at least one of the at least two sidewalls and the at least two arms comprises at least one of a rigid and a semi-rigid material.

43. A method according to claim 42, wherein the rigid and semi-rigid material allows the arms to be temporarily forcibly separated for placement around the shaft.

44. A workstation device according to claim 1, further comprising a line transfer assembly.

45. A workstation device according to claim 1, further comprising at least one of an accessory selected from a utility box, a tool shelf, a drink holder, a rod holder, a tackle pouch, and an attachment hook.

46. A workstation device according to claim 45, wherein at least one accessory is removably attached to the workstation device.

47. A workstation device according to claim 1, wherein at least the platform is substantially horizontal when the trolling motor is in use.

* * * * *